US008301620B2

(12) United States Patent
Sthanikam et al.

(10) Patent No.: US 8,301,620 B2
(45) Date of Patent: Oct. 30, 2012

(54) EFFICIENT WAY TO EVALUATE AGGREGATIONS ON XML DATA USING PATH-BASED ROW SOURCES

(75) Inventors: Balasubramanyam Sthanikam, Foster City, CA (US); Sam Idicula, Santa Clara, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 321 days.

(21) Appl. No.: 12/474,133

(22) Filed: May 28, 2009

(65) Prior Publication Data

US 2010/0306220 A1    Dec. 2, 2010

(51) Int. Cl.
G06F 7/00 (2006.01)
G06F 17/30 (2006.01)
(52) U.S. Cl. .......................... 707/713; 707/716
(58) Field of Classification Search .................. None
See application file for complete search history.

(56) References Cited

U.S. PATENT DOCUMENTS

| 6,609,123 | B1* | 8/2003 | Cazemier et al. ................ 1/1 |
| 7,165,063 | B2 | 1/2007 | Beyer et al. |
| 7,756,858 | B2* | 7/2010 | Lindblad et al. ............ 707/716 |
| 7,840,547 | B1 | 11/2010 | Tucker et al. |
| 7,870,124 | B2 | 1/2011 | Liu et al. |
| 7,882,089 | B1* | 2/2011 | Levy ............................ 707/705 |
| 7,921,129 | B2 | 4/2011 | Madan et al. |
| 2003/0167258 | A1 | 9/2003 | Koo et al. |
| 2004/0148420 | A1* | 7/2004 | Hinshaw et al. ............. 709/231 |
| 2004/0205082 | A1* | 10/2004 | Fontoura et al. ............. 707/101 |
| 2005/0097084 | A1 | 5/2005 | Balmin et al. |
| 2005/0108209 | A1 | 5/2005 | Beyer et al. |
| 2006/0026113 | A1* | 2/2006 | Omoigui ....................... 706/55 |
| 2007/0011184 | A1* | 1/2007 | Morris et al. ................. 707/101 |
| 2007/0076936 | A1 | 4/2007 | Li et al. |
| 2007/0130110 | A1 | 6/2007 | Graefe et al. |
| 2007/0162426 | A1 | 7/2007 | Brown et al. |

(Continued)

OTHER PUBLICATIONS

Funderburk et al, "XML programming with SQL/XML and XQuery", 2002, IBM System Journal, vol. 41, No. 4, pp. 642-665.*

(Continued)

*Primary Examiner* — Angelica Ruiz
(74) *Attorney, Agent, or Firm* — Hickman Palermo Truong Becker Bingham Wong LLP

(57) ABSTRACT

The approaches described herein provide an efficient way for a database server to process certain kinds of queries that require the evaluation of an aggregation function over XML data stored in an object-relational database. An aggregation function takes multiple inputs and generates a single output. A database server first determines whether the query qualifies for this particular kind of optimization, then creates a query execution plan that specifies the use of an enhanced path-based row source, eliminating the need for a second path-based row source for computing the aggregation function. The enhanced path-based row source specified in the query execution plan computes an aggregation function and stores the result of that function computation in a column of each row. The XPath evaluation results that are the individual inputs to the aggregation function are only stored temporarily until they are used to compute the aggregation function.

14 Claims, 6 Drawing Sheets

U.S. PATENT DOCUMENTS

| | | |
|---|---|---|
| 2007/0168324 A1 | 7/2007 | Grabs et al. |
| 2007/0233645 A1 | 10/2007 | Peterson et al. |
| 2007/0276825 A1 | 11/2007 | Dettinger et al. |
| 2007/0276835 A1 | 11/2007 | Murthy |
| 2007/0299834 A1 | 12/2007 | Liu et al. |
| 2008/0065674 A1 | 3/2008 | Liu et al. |
| 2008/0114803 A1 | 5/2008 | Chinchwadkar et al. |
| 2008/0120283 A1* | 5/2008 | Liu et al. ............... 707/4 |
| 2008/0172353 A1 | 7/2008 | Lim et al. |
| 2008/0222101 A1 | 9/2008 | Beyer et al. |
| 2008/0222123 A1 | 9/2008 | Colby et al. |
| 2009/0070313 A1 | 3/2009 | Beyer et al. |
| 2009/0100004 A1* | 4/2009 | Andrei et al. ............ 707/2 |
| 2009/0125480 A1 | 5/2009 | Zhang et al. |
| 2009/0210383 A1 | 8/2009 | Seemann |
| 2009/0259641 A1 | 10/2009 | Balmin et al. |
| 2009/0287670 A1 | 11/2009 | Hou et al. |
| 2010/0293199 A1 | 11/2010 | Sthanikam et al. |
| 2010/0299832 A1 | 12/2010 | Alford |
| 2010/0306219 A1 | 12/2010 | Sthanikam et al. |
| 2010/0312756 A1 | 12/2010 | Zhang et al. |

OTHER PUBLICATIONS

Hemel et al., "Code Generation by Model Transformation, A case Study in Transformation Modularity," Theory and Practice of Model Transformations Lecture Notes in Computer Science, 2008, vol. 5063/2008, pp. 183-198.

Zhang et al., "Honey, I Shrunk the XQuery!—An XML Algebra Optimization Approach," WIDM '02, Nov. 8, 2002, ACM, pp. 15-22.

U.S. Appl. No. 12/467,984, filed May 18, 2009, Final Office Action, Oct. 31, 2011.

U.S. Appl. No. 12/474,124, filed May 28, 2009, Final Office Action, Dec. 12, 2011.

* cited by examiner

```
<auction>
 <site>
  <regions>                            — 120
   <africa>
    <item> sales=$4M </item>
    <item> sales=$15M </item>
   </africa>
  </regions>
  <regions>
   <europe>
    <item> sales=$3M </item>
   </europe>
  </regions>
  <regions>                            — 130
   <africa >
    <item> sales=$7M </item>
   </africa>
  </regions>
  <regions>
   <northamerica>
    <item>sales=$20M></item>
   </northamerica>
  </regions>
 </site>
</auction>
```

100

```
for $p in $auction/site/regions  — 140
return count($b/africa/item)  — 150
```

EFFICIENT WAY TO EVALUATE AGGREGATIONS ON XML DATA USING PATH-BASED ROW SOURCES

CROSS-REFERENCE TO RELATED APPLICATIONS; BENEFIT CLAIM

This application is related to U.S. patent application Ser. No. 11/182,997 filed on Jul. 14, 2005, entitled "Encoding Of Hierarchically Organized Data For Efficient Storage And Processing;" U.S. patent application Ser. No. 12/474,124 filed on May 28, 2009 entitled "Cache-Based Predicate Handling For Queries On XML Data Using Uncorrelated Path-Based Row Sources;" and U.S. patent application Ser. No. 12/467,984 filed on May 18, 2009 entitled "Efficient Way To Evaluate Uncorrelated Path-Based Row Sources With XML Storage." The contents of all patent applications cited in this paragraph are incorporated by reference.

This application is also related to U.S. patent application Ser. No. 12/478,147 filed on Jun. 4, 2009 entitled "Query Optimization By Specifying Path-Based Predicate Evaluation In A Path-Based Query Operator."

FIELD OF THE INVENTION

The techniques presented herein are directed towards storing XML data in a relational database, and querying the data in an efficient way.

XML Documents

XML (eXtensible Markup Language) is becoming increasingly popular as the format for describing and storing all forms of data. Thus, providing support for storing, searching, and manipulating XML documents is an extremely important problem for data management systems today.

Because of the popularity of XML as a data exchange format that supports hierarchical relationships among elements, and because of the power of relational data management systems (DBMS) to update and retrieve data, there is a demand for storing XML data into relational databases and querying XML data from relational databases using native XML query constructs.

Querying XML Data Stored in an Object-Relational Database

When XML data is stored in an object-relational database, there are several choices about how the XML data is stored and how users express queries to retrieve the data. Users often find it convenient to use XQuery expressions to query for XML data, relying on the database management system to translate the XQuery expressions into SQL statements that are optimized for the database system. XQuery 1.0 was developed by the XML Query working group of the W3C, and became a W3C recommendation in January 2007. The translation from XQuery to SQL and the optimization of the SQL depends on several factors including the nature of the XQuery and how the XML data is stored in the database.

XPath Expressions

XPath is a language for addressing XML documents that operates on the abstract, logical structure of an XML document, rather than its surface syntax. XPath gets its name from its use of a path notation, as in URLs, for navigating through the hierarchical structure of an XML document. The XPath data model is described in detail in Section 5 ("Data Model") of "XML Path Language (XPath)" (version 1.0), a W3C (World Wide Web Consortium) Recommendation dated 16 Nov. 1999.

The primary syntactic construct in XPath is the expression. XPath expressions are described in Section 3 ("Expressions") of "XML Path Language (XPath)" (version 1.0). One important kind of expression is a location path which indicates a set of nodes relative to a context node. The semantics of location paths are described in Section 2 ("Location Paths") of "XML Path Language (XPath)" (version 1.0).

XPath is a subset of XQuery. That is, an XPath expression is also an XQuery expression. However, XQuery also has programming constructs in addition to XPath expressions.

Binary XML

The size of individual XML documents has been growing. XML documents can be as large as multi-megabytes and are expected to grow significantly over time. Binary XML is a compact binary representation of XML that was designed to reduce the size of XML documents and is one format in which XML data can be stored in a database. Binary XML reduces the overall size of the XML document. In addition, sending a binary-encoded XML document over the network requires fewer bytes to be transmitted, thus consuming less network bandwidth.

However, Binary XML requires more processing time to query and manipulate. The binary encoding must be decoded in order to interpret the document. Thus, each time an XPath expression is evaluated over binary XML, additional computation is necessary over what would be required when simply operating on an in-memory tree-representation or even a textual representation of the document. Techniques are needed to increase the performance of querying binary-encoded XML data stored in an object-relational database while keeping the benefits that the database management system provides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an example XML document and an example XQuery expression that takes the XML document as input.

DETAILED DESCRIPTION

Figure 2:
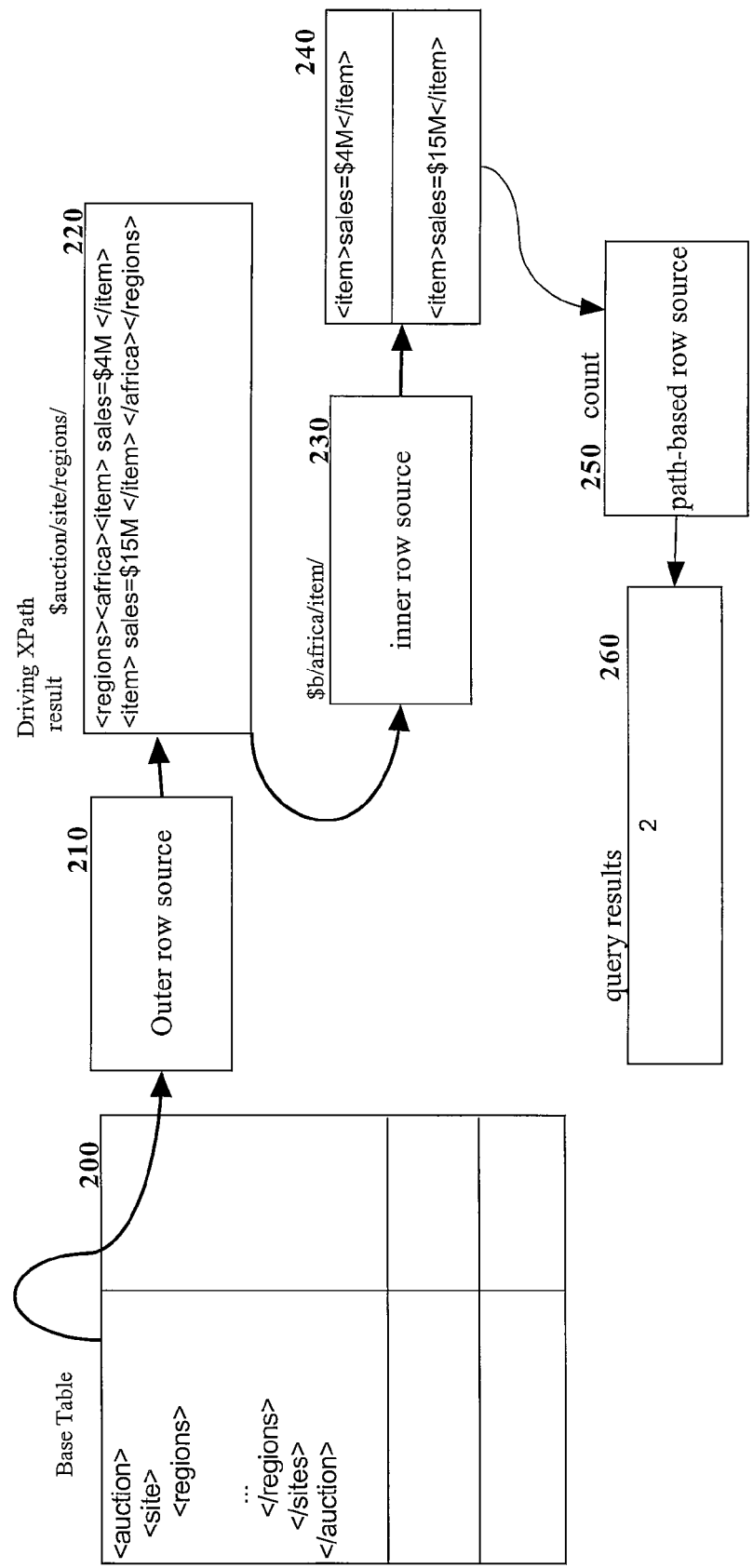
FIG. 2 is a diagram showing the relationships among row sources for an example XQuery expression.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The approaches described herein provide an efficient way for a database server to process certain kinds of queries that require the evaluation of an aggregation function over XML data stored in an object-relational database. An aggregation function is one that takes multiple inputs and generates a single output. Examples include SUM, COUNT, MIN, MAX, and XMLAGG. A database server first determines whether a query qualifies for this particular kind of optimization. When the query qualifies for the optimization, the database server creates a query execution plan that specifies the use of an enhanced path-based row source. The enhanced path-based row source specified in the query execution plan can compute an aggregation function and store the result of that function computation in a column of each row it generates without emitting or outputting the intermediate XPath evaluation results that are used as the individual inputs to the aggregation function.

XQuery

XQuery is used to query collections of XML data. It is semantically similar to SQL. The SQL/XML committee has decided to accept the XQuery data model for the XMLType data type. When XML data is stored in a database, a user may retrieve the XML data by writing XQuery expressions.

XQuery uses XPath expression syntax to address specific parts of an XML document. It supplements the XPath expression syntax with SQL-like "FLWOR expressions." A FLWOR expression is constructed from the five clauses after which it is named: FOR, LET, WHERE, ORDER BY, RETURN. The FOR clause is a looping construct as in many programming languages and provides the ability to iterate over a set of operations. FOR clauses may be nested; that is, one FOR clause may be located within another FOR clause.

The FOR clause generates a set of XML nodes corresponding to the evaluation of the XPath expression. The WHERE clause filters this set of nodes, and the RETURN clause often specifies a function to perform on the set of nodes, and to return the value of the computed function. When the specified function in the RETURN clause is an aggregate function, there is typically another XPath expression that is evaluated over each node that is generated by the FOR clause. There may be multiple XPath expression results for each such node, each of which serves as input to the aggregation function.

XQuery Example

FIG. 1 shows an example XQuery expression 110 that operates on the XML Document, 100. The entire document 100 is stored as Binary XML in an XMLType column of an object-relational database table. This relational table is called the "base table" for the XQuery. Document 100 records the dollar amount of items sold in auctions by region. "Africa," "Europe," and "North America" are the regions with entries in the document, and there is more than one instance of the region element representing Africa (<africa>). The first <africa> element 120 shows the sale of two items and the second <africa> instance 130 shows one sold item. The XQuery expression 110, returns the number of sold items in each instance of <africa>. Thus, the expected output of the query expression 110 is the sequence (2 1) corresponding to the number of items sold in the first and second Africa elements respectively.

The above explanation was expressed with respect to the textual representation of the XML document as shown in FIG. 1. However, the input to the example XQuery expression may be binary-encoded XML data which may be parsed by a streaming parser. In the description that follows, the portion of an XML document previously referred to as an element may be referred to as a node. An XML node is the root of a sub-hierarchy, and the unit of navigation through the document.

The XQuery expression 110, has a FOR loop 140 (more generally referred to as an "iteration expression") that iterates over the 4 nodes rooted at an instance of <regions>. In order to count the number of items sold in each an Africa region, the instances of <regions> must be filtered so that only the <regions> containing an <africa> node are processed, then all the instances of <item> in each <africa> node must be found and counted. For each instance of $p/regions/africa/," there may be multiple sold items.

The XQuery operates on the entire auction document represented by 100, which is stored in a column of the base table. The iteration of the outer loop 140, retrieves and processes at all instances of "$auction/site/regions/" in the document. This results in a sequence of XML fragments, each corresponding to a <regions> node. Using these fragments as input, the XPath expression "$p/regions/africa/item/" is evaluated. Because there are multiple sales items from the first instance of <africa>, evaluating "$p/regions/Africa/item/" results in a sequence of multiple XML fragments corresponding to each <item> node. Thus, generating the results of the inner XPath expression cannot be performed by the same path-based row source as the outer XPath expression because the cardinality of the output for these two XPath expressions is different. For each row produced by the outer path-based row source, there are potentially many rows produced by the inner row source. In this example, the single row produced by the outer path-based row source corresponding to expression 140 results in 2 rows produced by the inner path-based row source corresponding to expression 150.

Query Rewrite and Optimization

When a database system receives an XQuery expression for retrieving XML data stored within the database, the database system performs a series of steps of translation, rewriting, and optimization before executing the query. Each step of query transformation may result in a re-formed text-based representation of the query. Alternatively, the database system may represent the transformed query as in-memory data structures at one or more steps of query transformation.

The next sections describe query transformations that are relevant to the techniques described herein.

XQuery to SQL Translation

An XQuery expression is re-written in terms of XML-aware SQL constructs before the expression can be computed. Relational databases operate on rows and columns, and thus, XQuery expressions must be translated into SQL operations that can operate on binary encoded XML data and create a row comprising columns of XMLType data and scalar values.

Each XQuery FLOWR expression is re-written as an XML-aware query operator, such as the XPATHTABLE query operator used by Oracle. The XML-aware query operator specifies the driving XPath expression whose evaluation will determine the cardinality and contents of a set of rows. Each result of the driving XPath expression evaluation will create one row. The XML-aware query operator will also specify an XPath expression corresponding to each of the columns in the row. To generate the value of a column, the XPath expression corresponding to the column is evaluated on the results from evaluating the driving XPath expression for this row.

From the XQuery example shown above, the two XML-aware query operators are generated at XQuery rewrite time. One query operator corresponds to the XQuery FLOWR expression 140 and the other corresponds to the argument of the aggregation function in expression 150. Here is a simplified example of XML-aware SQL generated for the XQuery example using the query operator XPATHTABLE to specify the rows and columns of XML data to be generated in the query:

```
SELECT SYS_IXQAGG(SELECT COUNT(P1.C0)
        FROM XPATHTABLE('/REGIONS/AFRICA/ITEM'
            PASSING P.C0
            COLUMNS C0 XMLTYPE PATH '.'
        ) P1
    )
FROM XPATHTABLE('/SITE/REGIONS'
        PASSING XMARK.XMLDATA
        COLUMNS C0 XMLTYPE PATH '.'
    ) P
```

The XPATHTABLE query operator corresponding to 140 specifies a driving XPath expression of "$auction/site/regions" to get a list of the <regions> nodes. The query operator corresponding to expression 150 specifies a driving XPath expression of "$b/africa/item" to get the list of <item> nodes within each of the <africa> nodes found in the iteration expression.

SQL Query Rewrite

Once an XQuery expression is re-written into XML-aware SQL constructs, a database server optimizes the query and generates an execution plan. Optimization may require analysis of the relationships among the XML-aware query operators to determine their interdependency. In one embodiment, recognizing that an optimization is possible requires evaluating two criteria. The first criterion is whether the query operators are correlated. In this context, correlated means that a second query operator requires input from (i.e. depends on) output from a first query operator. If two query operators are so correlated, then the XPaths computed by the second query operator can be computed within the first. The second criterion is that the cardinality specified by the second query operator is different than the cardinality specified by the first query operator, and an aggregation function takes input from the results of a second query operator to generate a single value equal in cardinality to the first query operator. The optimization described herein may be performed upon recognizing that both criteria are met.

In the example query, the two XML query operators specify row generators that are correlated because the query operator corresponding to expression 150 depends on the nodes generated by the query operator corresponding to expression 140. The COUNT aggregation function takes as an argument the list of item element fragments found within "$b/regions/africa," and returns the count of those items. Thus, the optimization described below may be performed on the example query because both criteria are met.

XPath Row Source

The outcome of query optimization is a query execution plan. The query execution plan provides the instructions to the SQL engine as to the sequence of function calls and their parameters. For example, each of the XML-aware query operators described above will be used as input to the construction of the query execution plan to parameterize a function that the SQL engine will invoke at run time. When the query meets the specific criteria for optimization as described above, then an XPath row source can be invoked to perform run-time optimization.

A row source is a function which, when invoked by the SQL engine, produces a set of rows. A path-based row source is a row source that produces rows, with each row having a number of columns and each column generated by evaluating one or more path expressions such as XPath. (An XPath row source is a path-based row source that evaluates XPath expressions). A path-based row source generates a row containing XMLType data and can operate on XML data, and in particular, binary-encoded XML data.

An XML-aware query operator at least partially specifies the parameters to an XPath row source. An example of an XPath row source is Oracle's XPATHTABLE row source. Oracle's XPATHTABLE query operator is an SQL language construct that is used as an intermediate result during query evaluation. The query operators specify some of the information that will be used when parameterizing the XPath row source, which is a run-time function. The XPath row source is included in the query execution plan.

At query execution time, the SQL Engine invokes an XPath row source to obtain a set of rows. The XPath row source evaluates its driving XPath, operating on its XMLType base column. The XPath row source may use streaming evaluation rather than constructing an entire XML document in memory. If the XML data is binary-encoded, the data is decoded as the data is streamed. In the example, the first row produced by the XPath row source corresponding to 150 would find the first <africa> node within a <regions> node and generate a row for each <item> node within <africa>).

For one document in the database, the XPath row source may produce multiple rows. Computing the XPath "$auction/site/regions" over the base table column will result in one row for each instance of <regions> in the document 100. The first row will be based on the results obtained the first time the driving XPath expression 140, associated with the outer row source, is computed. The next row will be based on the results obtained the next time the driving XPath expression is computed. The purpose of XPath row source is to facilitate a fast way to evaluate one or more XPaths on documents stored in a database, and since an XPath row source produces rows, relational SQL expressions work very well with an XPath row source.

Evaluating Aggregation Functions

An aggregation function is one that takes multiple inputs and generates a single output such as SUM, COUNT, MIN, MAX, and XMLAGG. Although most of the aggregation functions take scalar values and return a single scalar value, XMLAGG takes a set of XML fragments and returns a single fragment of XMLType data, and COUNT can take a sequence of XML fragments and returns a scalar. FIG. 2 shows the generation of the first row of query output of the example query as it would be performed without optimization. An outer path-based row source 210 corresponds to the FOR clause 140. It takes input from the base table 200 and generates a row containing a column for the results of evaluating the driving XPath "$auction/site/regions" 220. The inner path-based row source 230 takes the first column of the row generated by the outer row source and generates a row 240 for each <item> within <africa>. Yet another path-based row source 250 is needed for computing the COUNT aggregation function. Row source 250 counts the number of rows 240 generated by the inner row source 230 to generate a row of query results 260. The contents of the rows in 240 do not appear in the output 260, but rather are intermediate results used to derive the final output.

This query can be optimized by enhancing the capability of the outer row source to not only further filter the row output to only those <regions> nodes that contain an <africa> node, but also to compute and store the results of the aggregation function in a column of output so that the rows it generates may contain all the information necessary to create the output to the query. As mentioned earlier, the individual sales items for each instance of $auction/site/regions/africa cannot be put into a single column of the rows generated by the outer row source because the cardinality does not match the cardinality of the outer row source. However, the individual sales items are not required outside of a path-based row source, and thus, may be stored as intermediate results within the outer row source as input to an aggregation function that is computed within the same row source.

Figure 3:
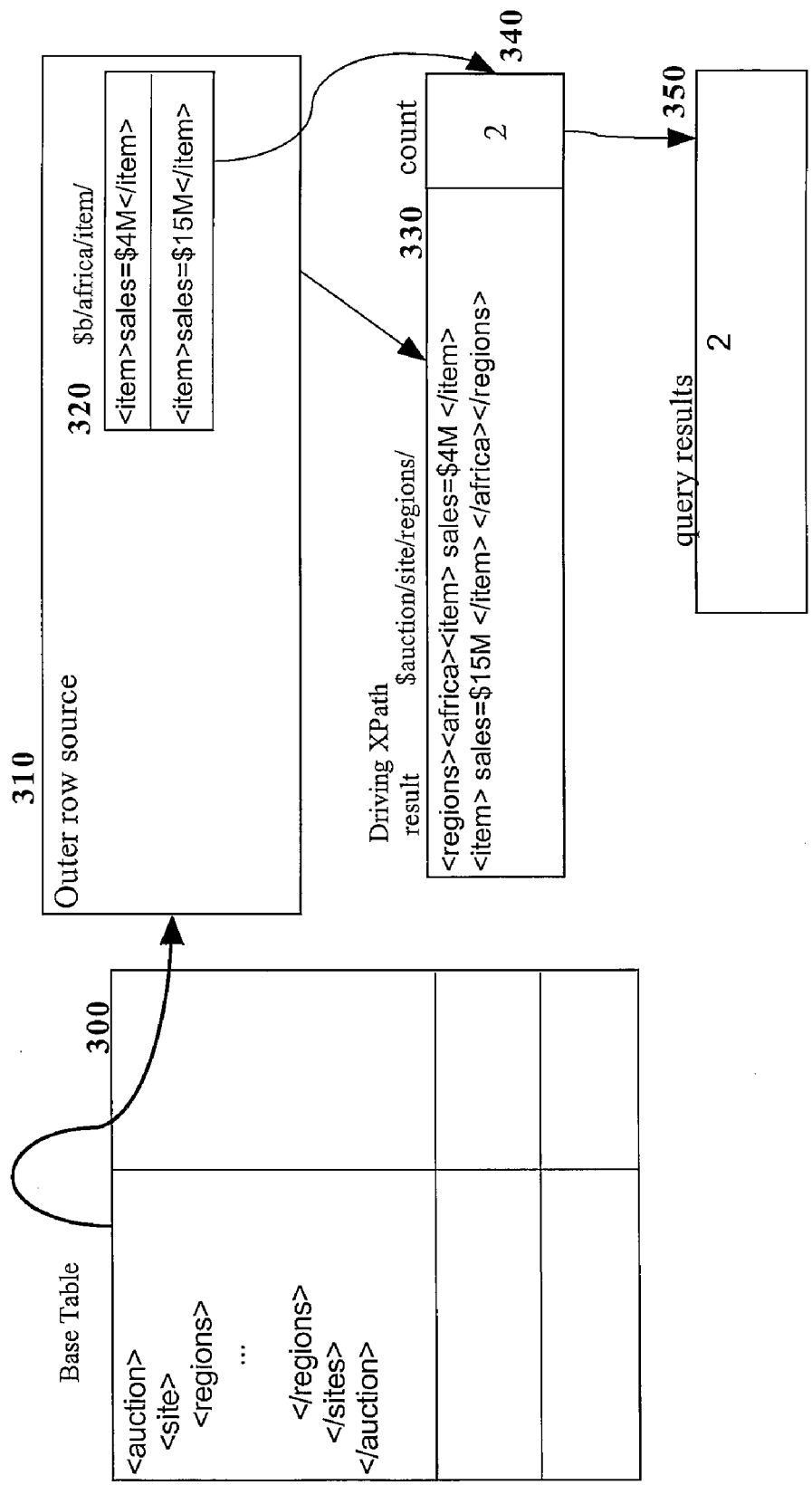
FIG. 3 is a diagram showing the elimination of the inner row source by enhancing the outer row source to compute an aggregation function.

FIG. 3 is a diagram of the query evaluation after the optimization. The query execution plan is written so that the database system invokes and executes the outer path-based row source 310 in a way that enables the outer path-based row source to compute the aggregation function. First, the XPath expression from the inner row source ("$b/africa/item") must be computed within the outer row source, and the multiple results stored temporarily 320. Second, the outer row source must be provided or supplied with the aggregation function to compute on the set of temporary results. The result of performing the aggregation function on the set of temporary results 320 is stored in a column 340 of the row 330 generated by the outer path-based row source. This technique exploits the fact that an aggregation function has a single output, and thus matches the cardinality of the outer path-based row source.

By enhancing the functionality of the outer row source to subsume the work of the inner row source, the query results 350 can be generated more efficiently because an expensive path-based row source (for example, path-based row source 230 of FIG. 2) can be eliminated.

When re-writing the query expression with this optimization, any reference to the result of the aggregation function is rewritten as a reference to column 340 of the enhanced path-based row source output.

Preferred Embodiment

Figure 4:
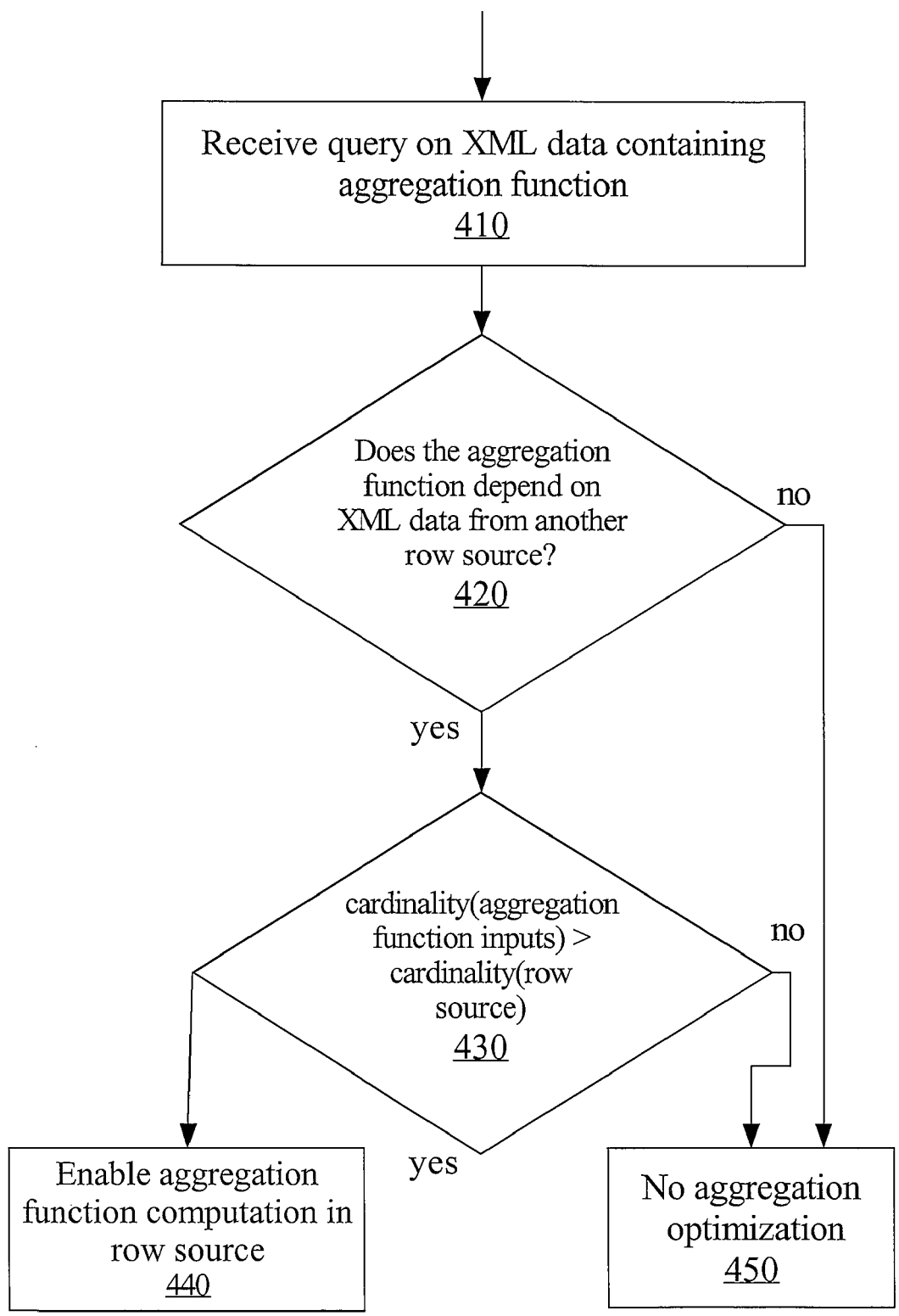
FIG. 4 is a flow diagram showing the analysis of an XQuery expression to determine whether an aggregation-based optimization can be made.
Figure 5:
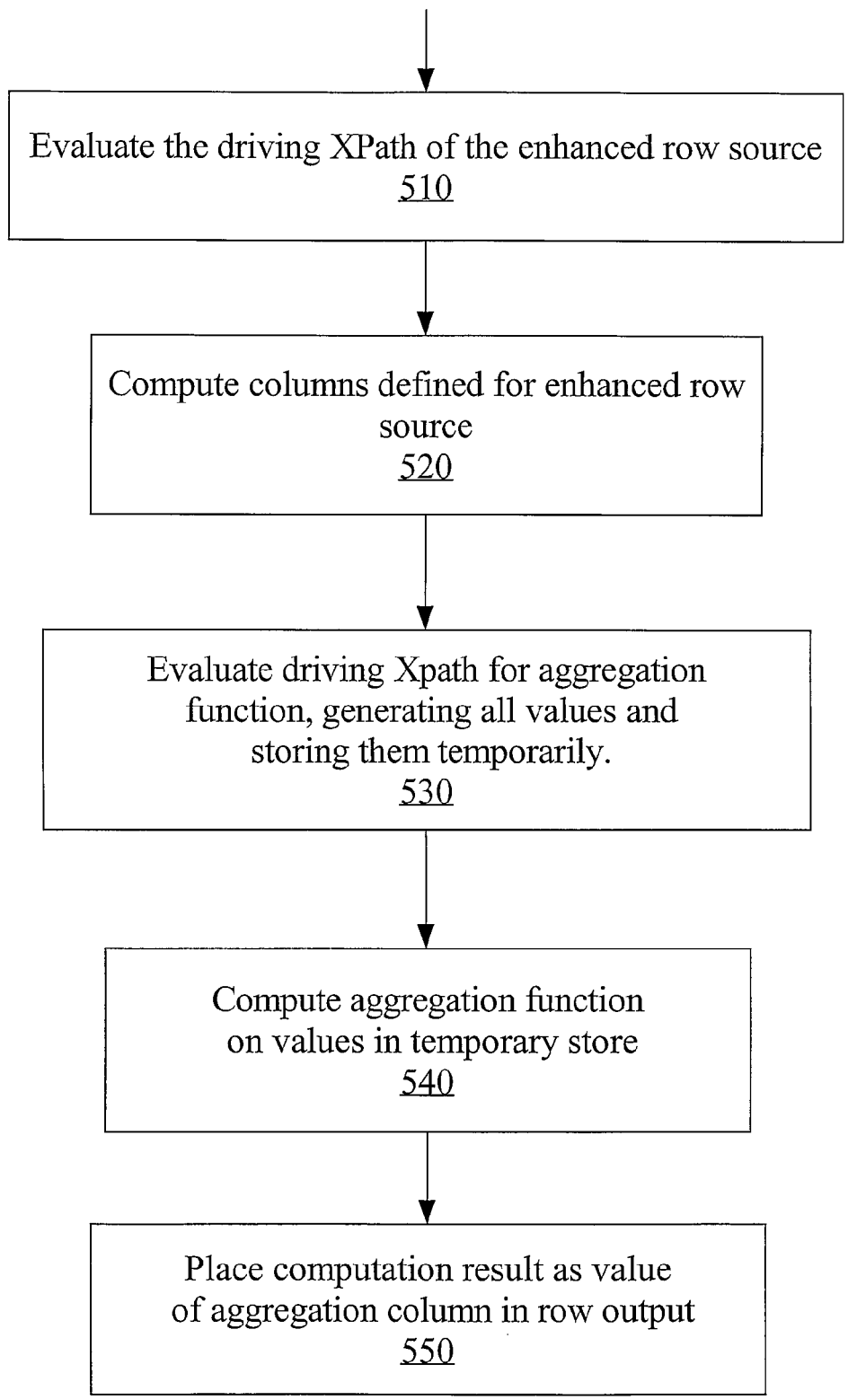
FIG. 5 is a flow diagram showing the steps for computing the query using an enhanced row source.

FIGS. 4 and 5 show the steps for an embodiment of the techniques described herein. FIG. 4 shows the steps during query compilation for recognizing that the optimization for computing an aggregation function within a path-based row source may be performed. In Step 410, the database server receives a query for retrieving XML data, and the query contains an aggregation function. In Step 420, the query is analyzed to determine whether the XPath specified in the aggregation function uses output from another path-based row source as its driving operand. If not, then this query is not a candidate for this particular aggregation optimization (Step 450). If so, then in Step 430, the cardinality of the XPath function that provides values to the aggregation function is compared to the cardinality of the path-based row source that provides the driving operand mentioned in Step 420. If the cardinality of the inputs to the aggregation function is greater than the cardinality of the path based row source, then the query may be optimized by this technique. In other words, if for every row generated by the outer path-based row source, multiple values must be generated as input to the aggregation function, then the second criterion is met for optimizing the query. In Step 440, the outer path-based row source is enabled to subsume the inner path-based row source, including the computation of the aggregation function.

FIG. 5 shows the steps that are performed during query execution. An enhanced path-based row source is used that can compute the aggregation within the row source. The flow shown in FIG. 5 is performed once for each row generated by the enhanced path-based row source. In Step 510, the driving XPath is evaluated for the next instance of the specified path in the document. In Step 520, the columns of the row source are computed based on the results of the driving XPath evaluation. Step 530 performs the work previously performed by the eliminated path-based row source. The enhanced path-based row source evaluates the driving XPath of the aggregation function based on the driving operand comprising one of the columns computed in Step 520. The enhanced path-based row source generates values for all matching XPaths and stores the values temporarily. In Step 540, the aggregation function is computed with the temporarily stored values as arguments. In Step 550, the computed function value is placed in a column of the row output.

Other Embodiments

As described above, the preferred embodiment is to analyze the internal representation of the XML-aware SQL constructs after rewriting XQuery and XMLTABLE constructs into XPath query operators to determine whether these aggregation-based optimizations can be performed. However, the analysis techniques described herein for identifying the optimization criteria can also be applied directly to the XQuery or XMLTABLE expressions during the query re-writing process. In other words, the opportunity to optimize can be detected directly based on analyzing the XQuery or XMLTABLE syntax directly without rewriting the XQuery or XMLTABLE constructs into SQL first.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

XML Storage

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML data are referred to herein as base tables or objects.

Binary-encoded XML is another form in which XML data may be stored in a database. Binary-encoded XML is a compact binary representation of XML that was designed to reduce the size of XML documents. One of the ways binary-encoded XML compresses data is by representing strings ("tokens") with fixed values.

In one implementation of binary-encoded xml, a mapping is established between character strings and replacement values, where the character strings are tag names, and the replacement values are numbers. Such mappings are referred to herein as "translation information".

Database servers that store XML data may include many mechanisms that allow for powerful and efficient ways to query large collections of XML documents. Database servers that store XML documents may be enhanced to efficiently perform XML operations using these mechanisms. A database server may maintain a "logical index", referred to herein as a XML index, that indexes a collection of XML. A logical index contains multiple structures that are cooperatively used to access a collection XML documents. According to an embodiment of the present invention, a logical index includes a path table, which contains information about the hierarchies of nodes in a collection XML documents and may contain the value of the nodes. Among the columns or attributes of the path table is a column that stores the path id of nodes.

When a database server receives a XML query, the database server may rewrite the query to refer to the underlying database structures that store the XML data. Such rewrites may include those described previously, those involving rewriting the query to refer to the data structures (e.g. path table) of the XML index.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
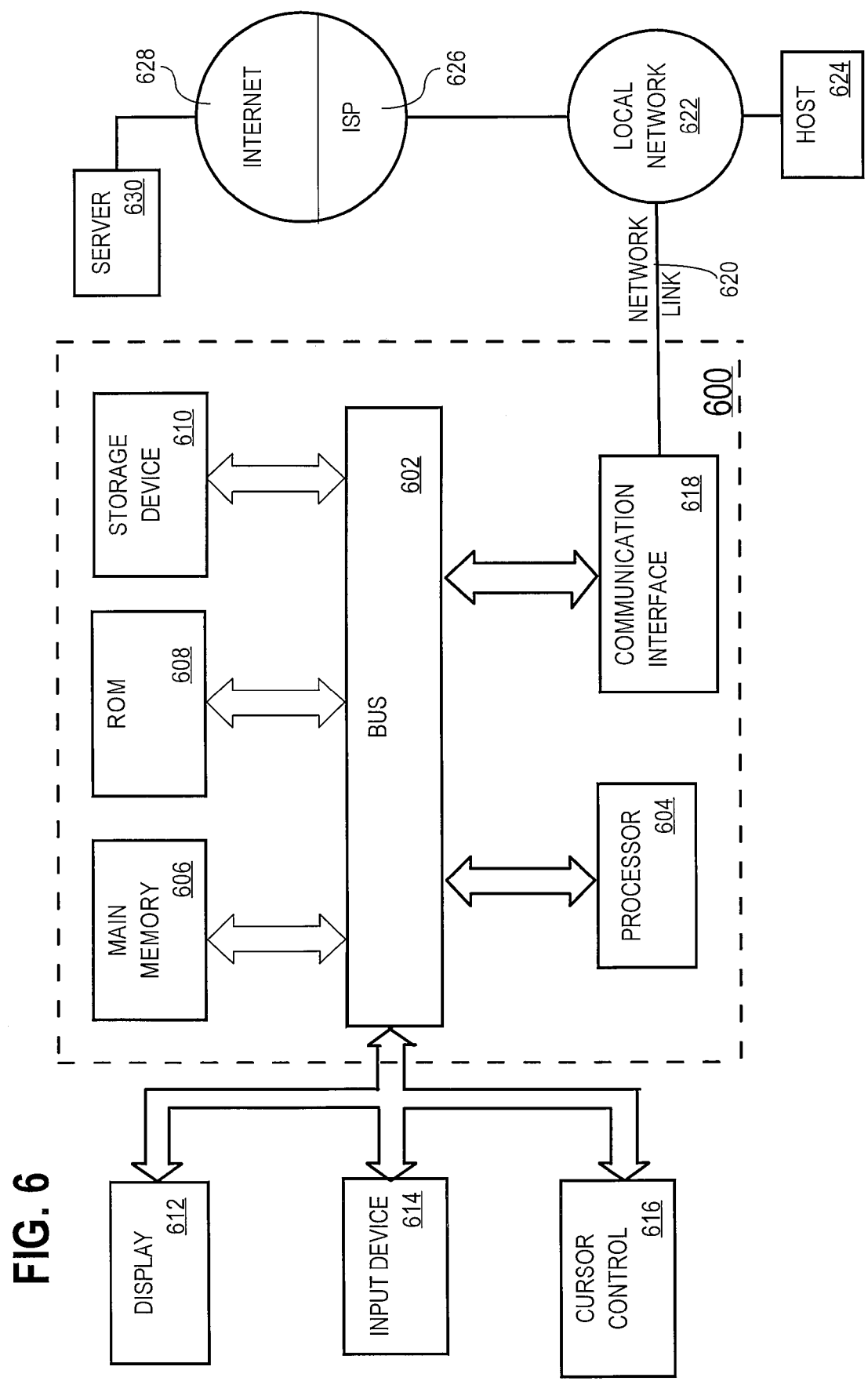
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   a server computing a query expression against a collection of XML documents stored in one or more tables of a database by, at least in part, executing a plurality of row sources of a query execution plan that is generated by the server to compute the query expression, said plurality of row sources including a path-based row source based on a path expression;
   said server determining whether to enable the path-based row source to compute an aggregate function; and
   in response to determining to enable the path-based row source to compute said aggregate function, said server enabling the path-based row source to compute said aggregate function;
   wherein the enabled path-based row source is configured to cause upon execution:

generating an aggregate value by applying an aggregate function to XML data identified, at least in part, by said path expression, said XML data being generated based on rows from said one or more tables of said database;

generating an output row of the path-based row source that contains said aggregate value;

wherein the method is performed by one or more computing devices.

2. The method of claim 1, wherein determining whether to enable the path-based row source to compute an aggregation function comprises determining whether the cardinality of a second path expression is greater than the cardinality of the driving path expression associated with the path-based row source, wherein the evaluation of the second path expression generates input values to the aggregation function.

3. The method of claim 1, wherein the path-based row source is an XPATHTABLE.

4. The method of claim 2, wherein the aggregate function is one of a set of aggregate functions comprising min, max, sum, count, and XMLagg.

5. The method of claim 2, wherein the driving operand is XML data from an XML base table.

6. The method of claim 2, wherein the driving operand is XML data in a row generated by a path-based row source.

7. The method of claim 4, wherein determining whether to enable the path-based row source to compute an aggregate function further comprises determining whether the path-based row source is correlated with a second path-based row source, wherein the second path-based row source depends on row data from the path-based row source as input.

8. A machine-readable storage medium storing instructions, wherein the instructions, when executed by one or more processors, cause:

a server computing a query expression against a collection of XML documents stored in one or more tables of a database by, at least in part, executing a plurality of row sources of a query execution plan that is generated by the server to compute the query expression, said plurality of row sources including a path-based row source based on a path expression;

said server determining whether to enable the path-based row source to compute an aggregate function; and in response to determining to enable the path-based row source to compute said aggregate function, said server enabling the path-based row source to compute said aggregate function wherein the enabled path-based row source is configured to cause upon execution:

generating an aggregate value by applying an aggregate function to XML data identified, at least in part, by said path expression, said XML data being generated based on rows from said one or more tables of said database;

generating an output row of the path-based row source that contains said aggregate value.

9. The machine-readable storage medium of claim 8, wherein determining whether to enable the path-based row source to compute an aggregation function comprises determining whether the cardinality of a second path expression is greater than the cardinality of the driving path expression associated with the path-based row source, wherein the evaluation of the second path expression generates input values to the aggregation function.

10. The machine-readable storage medium of claim 8, wherein the path-based row source is an XPATHTABLE.

11. The machine-readable storage medium of claim 9, wherein the aggregate function is one of a set of aggregate functions comprising min, max, sum, count, and XMLagg.

12. The machine-readable storage medium of claim 9, wherein the driving operand is XML data from an XML base table.

13. The machine-readable storage medium of claim 9, wherein the driving operand is XML data in a row generated by a path-based row source.

14. The machine-readable storage medium of claim 11, wherein determining whether to enable the path-based row source to compute an aggregate function further comprises determining whether the path-based row source is correlated with a second path-based row source, wherein the second path-based row source depends on row data from the path-based row source as input.

* * * * *

UNITED STATES PATENT AND TRADEMARK OFFICE
CERTIFICATE OF CORRECTION

PATENT NO. : 8,301,620 B2
APPLICATION NO. : 12/474133
DATED : October 30, 2012
INVENTOR(S) : Sthanikam et al.

Page 1 of 1

It is certified that error appears in the above-identified patent and that said Letters Patent is hereby corrected as shown below:

On page 2, in column 2, under "Other Publications", line 11, below "Dec. 12, 2011." insert -- U.S. Appl. No. 12/467,984, filed May 18, 2009, Notice of Allowance --.

In column 1, line 11, delete "12/474,124filed" and insert -- 12/474,124 filed --, therefor.

In column 14, line 6, in Claim 8, delete "function" and insert -- function; --, therefor.

Signed and Sealed this
Twelfth Day of February, 2013

Teresa Stanek Rea
*Acting Director of the United States Patent and Trademark Office*